US008066249B2

(12) United States Patent
Kerr

(10) Patent No.: US 8,066,249 B2
(45) Date of Patent: Nov. 29, 2011

(54) THEFT RESISTANT VIDEO PROJECTOR AND MOUNT

(76) Inventor: Rodney L. Kerr, Fort Lauderdale, FL (US)

( * ) Notice: Subject to any disclaimer, the term of this patent is extended or adjusted under 35 U.S.C. 154(b) by 1167 days.

(21) Appl. No.: 11/879,573

(22) Filed: Jul. 18, 2007

(65) Prior Publication Data

US 2009/0021653 A1 Jan. 22, 2009

(51) Int. Cl.
*F16M 13/00* (2006.01)

(52) U.S. Cl. ......................... 248/551; 248/317; 248/553

(58) Field of Classification Search .................. 248/551, 248/552, 553, 317; 70/57, 418, DIG. 7
See application file for complete search history.

(56) References Cited

U.S. PATENT DOCUMENTS 3,945,227 A * 3/1976 Reiland ............................. 70/58
4,147,334 A * 4/1979 Lafont et al. .................... 266/89
4,553,414 A * 11/1985 Caputo et al. ..................... 70/58
6,606,887 B1 8/2003 Zimmer
6,988,698 B2 1/2006 O'Neill
7,029,133 B2 4/2006 Challis
7,156,359 B2 1/2007 Dittmer
2003/0234335 A1 12/2003 Umberg
2004/0080665 A1 4/2004 Lovell
2007/0287331 A1* 12/2007 Young ........................... 439/607

* cited by examiner

*Primary Examiner* — Amy J Sterling
(74) *Attorney, Agent, or Firm* — Mark D. Bowen, Esq.; Malin Haley DiMaggio Bowen & Lhota, P.A.

(57) ABSTRACT

A video projector and mounting assembly that securely mounts and protects the projector from theft. A video projector unit is adapted with a housing that defines a through bore extending completely through the housing from top to bottom. A suspension member attached to an overhead structure is inserted through the hole with a portion thereof projecting from the bottom of the projector. A projector mount is secured to the end of the projecting portion of the overhead suspension member in locking relation therewith such that the projector may not be removed without first unlocking and removing the mount. The mount is preferably adapted with openings to allow for access to the projector controls. Tilt adjustment of the projector is facilitated by rotatably adjustable fasteners in threaded engagement with the mount. The projector and mount may include mating concave and convex surfaces to provide for adjustment in tilt, pan, and yaw axes.

6 Claims, 8 Drawing Sheets

THEFT RESISTANT VIDEO PROJECTOR AND MOUNT

CROSS REFERENCE TO RELATED APPLICATIONS

N/A

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

The present invention relates generally to video projectors, and more particularly, to a theft resistant video projector and ceiling mounting assembly.

2. Description of Related Art

Video projection units (hereinafter “projector”) are in widespread use in education, entertainment, and business environments. A video projector takes a video signal and projects the corresponding image on a projection screen using a lens system and a very bright light to project the image. Video projectors are widely used for conference room presentations, classroom training, and home theatre applications. Common display resolutions for a portable projector include SVGA (800×600 pixels), XGA (1024×768 pixels), 720 p (1280×720 pixels), and 1080 p (1920×1080 pixels). Projectors are often suspended below the ceiling by a downwardly projecting pipe member adapted with a projector mount.

Video projectors contain sophisticated electronics and geometrical optics in order to produce such high quality images. The cost of a projector is not only determined by its resolution, but also by its light output, acoustic noise output, contrast, and other characteristics. Accordingly, video projectors are valuable pieces of equipment often costing thousands of dollars. As a result of the popularity and value of projectors theft has become a problem that video projector manufacturers have failed to adequately address.

As a result of the failure of projector manufacturers to address theft issues, the background art reveals a number of mounting systems intended to address theft by rending projectors theft resistant. For example, U.S. Pat. No. 6,606,887, issued to Zimmer et al., discloses an anti-theft locking cover comprising two interlocking cover halves for use to prevent unwanted removal of a projector mounted in a suspended configuration. U.S. Pat. No. 7,029,133 issued to Challis, discloses an adjustable security enclosure for securing a projector. The apparatus is mountable to a ceiling drop pipe and comprises a cage and drop pipe connector assembly. The cage has a plurality of interconnected members that together define an enclosure for housing a projector and impeding removal of the projector from the cage. U.S. Pat. No. 7,156,359, issued to Dittmer et al., discloses an adjustable tamper-resistant overhead mounting system for a projector. The system includes brackets attachable to the projector and a suspension member attached to an overhead structure. Published U.S. Patent Application No. US 2003/0234335, in the name of Umberg, discloses security apparatus for connecting a projector to a structure using a structural mount, a security enclosure, and a swivel mechanism.

The various devices disclosed in the art suffer from a number of disadvantages and short comings and have thus failed to achieve widespread acceptance. Accordingly, there exists a need for an improved anti-theft overhead mount for use with a video projector unit.

BRIEF SUMMARY OF THE INVENTION

The present invention overcomes the limitations in the art by providing an improved video projector and overhead mounting assembly that securely mounts and protects the projector from theft. In accordance with a preferred embodiment, a video projector unit (Projector) is adapted with a housing that defines a hole or through bore extending completely through the housing from top to bottom. A suspension member attached to an overhead structure is inserted through the hole with a portion thereof projecting from the bottom of the projector. A projector mount is secured to the end of the projecting portion of the overhead suspension member in locking relation therewith. Accordingly, the projector may not be removed without first unlocking and removing the mount so as to allow the projector to move downward and off of the suspension member. The mount is preferably adapted with openings to allow for access to the projector controls, and tilt adjustment is facilitated by rotatably adjustable fasteners in threaded engagement with the mount. In an alternate embodiment, the bottom of the projector housing defines a concave hemispherical surface in surrounding relation with the mounting hole, and the attachable projector mount defines a convex hemispherical top surface for mating engagement with the projector housing. The corresponding concave and convex surfaces allow the projector to be manually adjusted in tilt, pan, and yaw axes.

Accordingly, it is an object of the present invention to provide an anti-theft video projector and mount.

Still another object of the present invention is to provide such a system wherein the projector is adapted with a housing defining a through bore.

Yet another object of the present invention is to provide an anti-theft video projector and mount for secure mounting of a projector while permitting tilt, pan, and yaw adjustment.

In accordance with these and other objects, which will become apparent hereinafter, the instant invention will now be described with particular reference to the accompanying drawings.

DETAILED DESCRIPTION OF THE INVENTION

Figure 1:
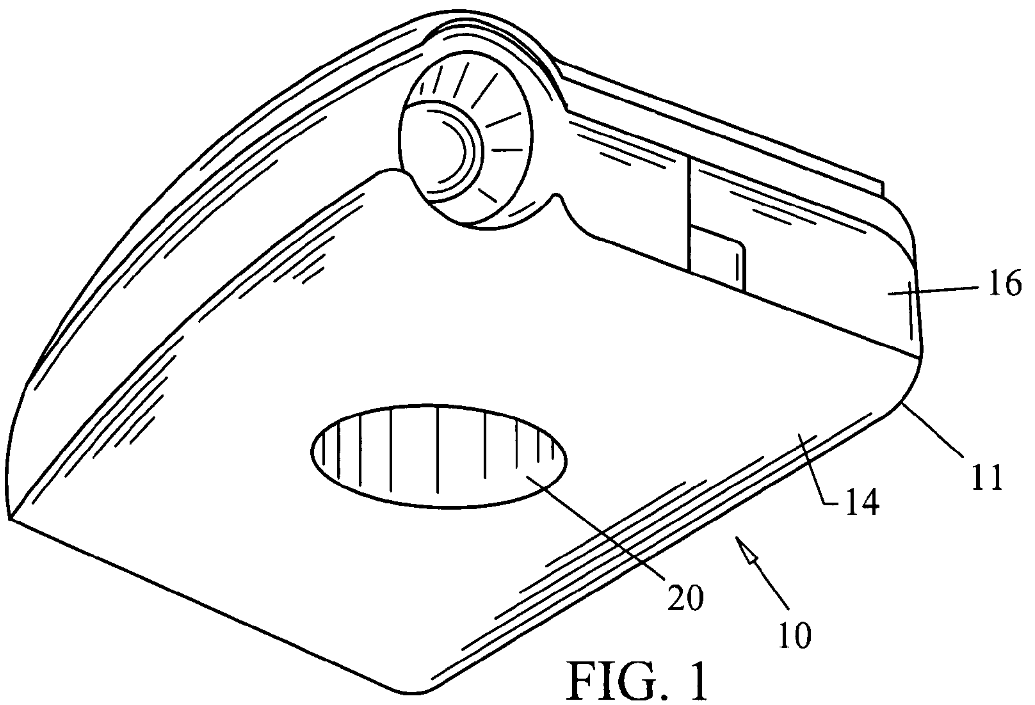
FIG. 1 is a perspective view of a video projector unit in accordance with the present invention.
Figure 2:
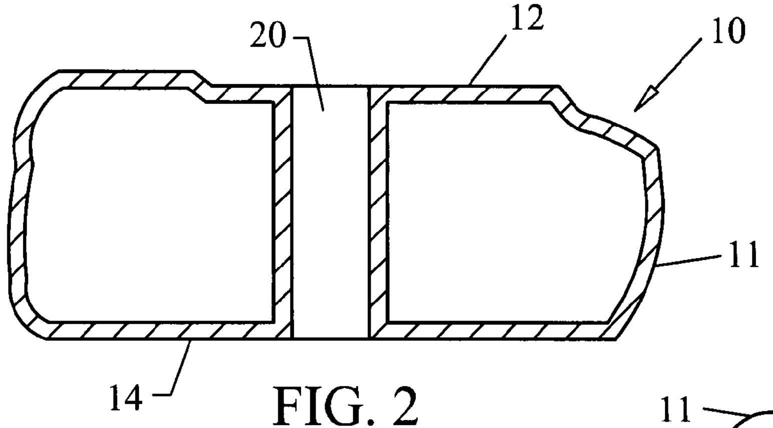
FIG. 2 is a side sectional view thereof.
Figure 3:
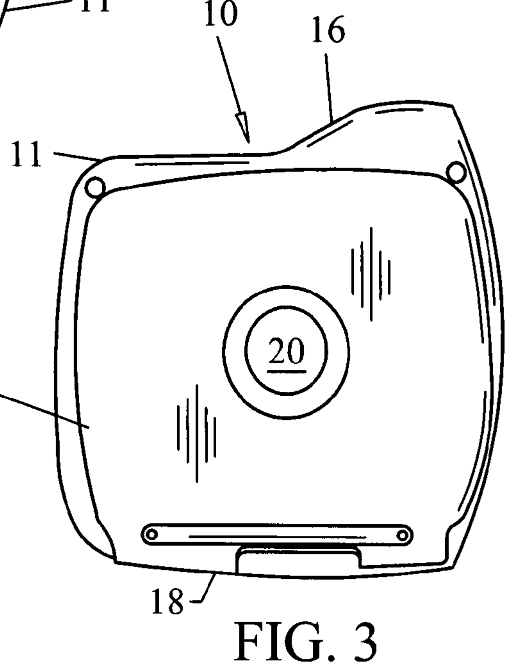
FIG. 3 is a top view thereof.

With reference now to the drawings, FIGS. 1-14 depict preferred and alternate embodiments of an improved video projector unit and mount assembly that comes the limitations in the art by providing a video projector and mount that protects that the projector from theft. As best seen in the preferred embodiment depicted in FIGS. 1-3, a video projector unit (Projector), generally referenced as 10, is disclosed. Projector 10 includes a housing 11 having a top 12, a bottom 14, a front 16, and a rear 18. Projector housing 11 defines a generally cylindrical aperture 20 extending completely through the housing from top 12 to bottom 14.

Figure 4:
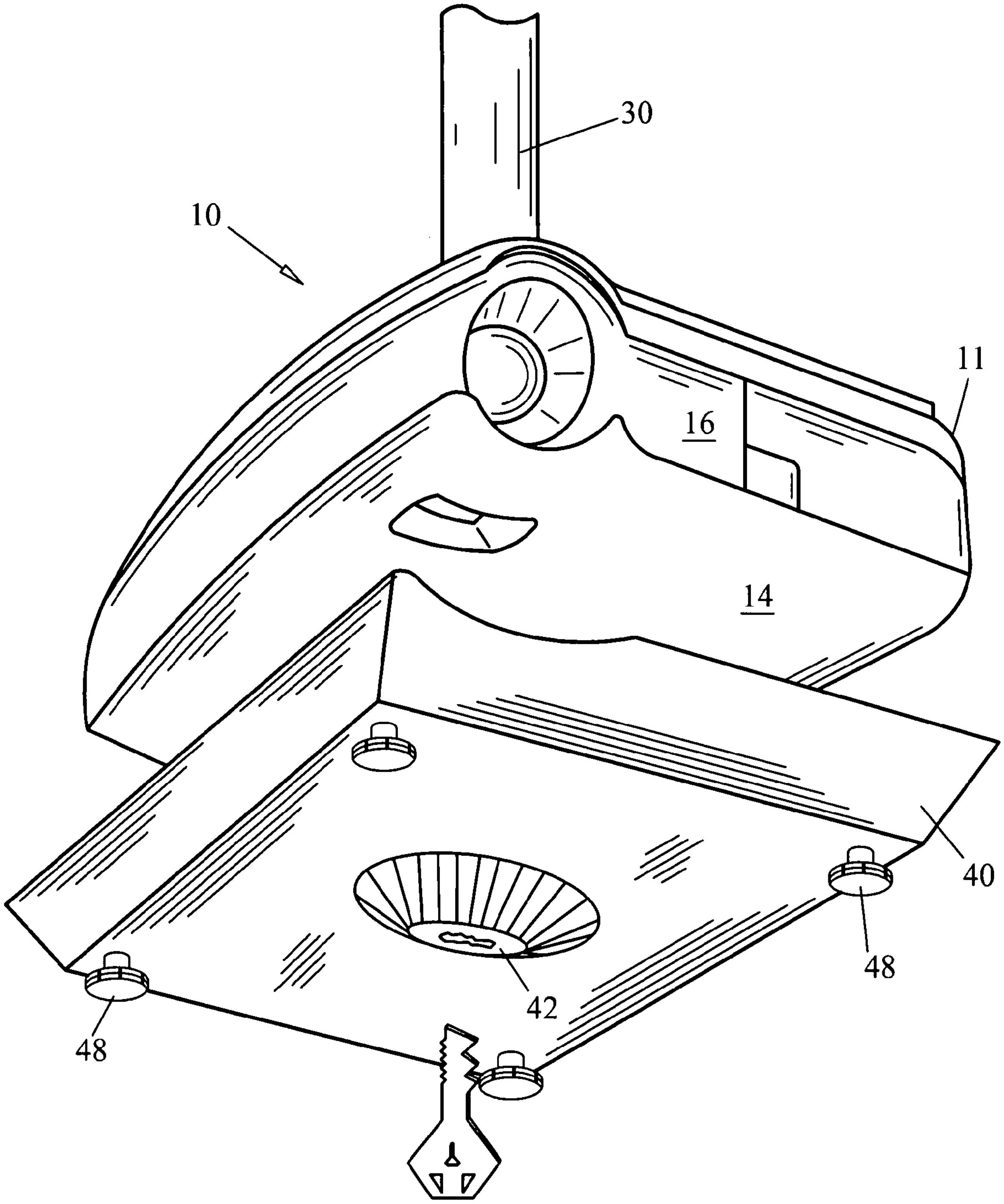
FIG. 4 is an exploded perspective view illustrating the projector and mount in relation to an overhead suspension member.
Figure 5:
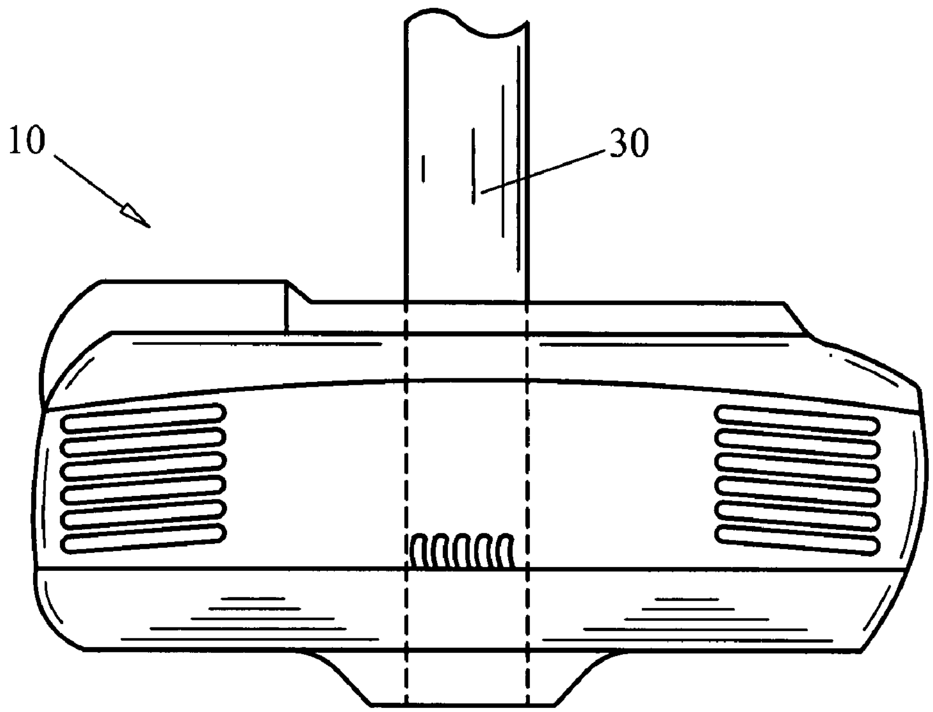
FIG. 5 is a side view showing the projector and mount in installed relation.

As illustrated in FIGS. 4 and 5, a suspension member 30, having a top end attached to an overhead structure, is inserted through housing aperture 20 by manually positioning projector housing 11 such that suspension member 30 passes completely through housing aperture 20 from the housing top 12 and through the housing bottom 14, whereby the bottom end of suspension member 30 projects from the bottom 14 of projector housing 11. Suspension member 30 is preferably a rigid, load-bearing member having a top portion affixed to an overhead structure in a configuration suitable for suspending a load therefrom. Suspension member is preferably generally cylindrical, and may be fabricated from metal or any other suitable rigid, load-bearing material.

Figure 8:
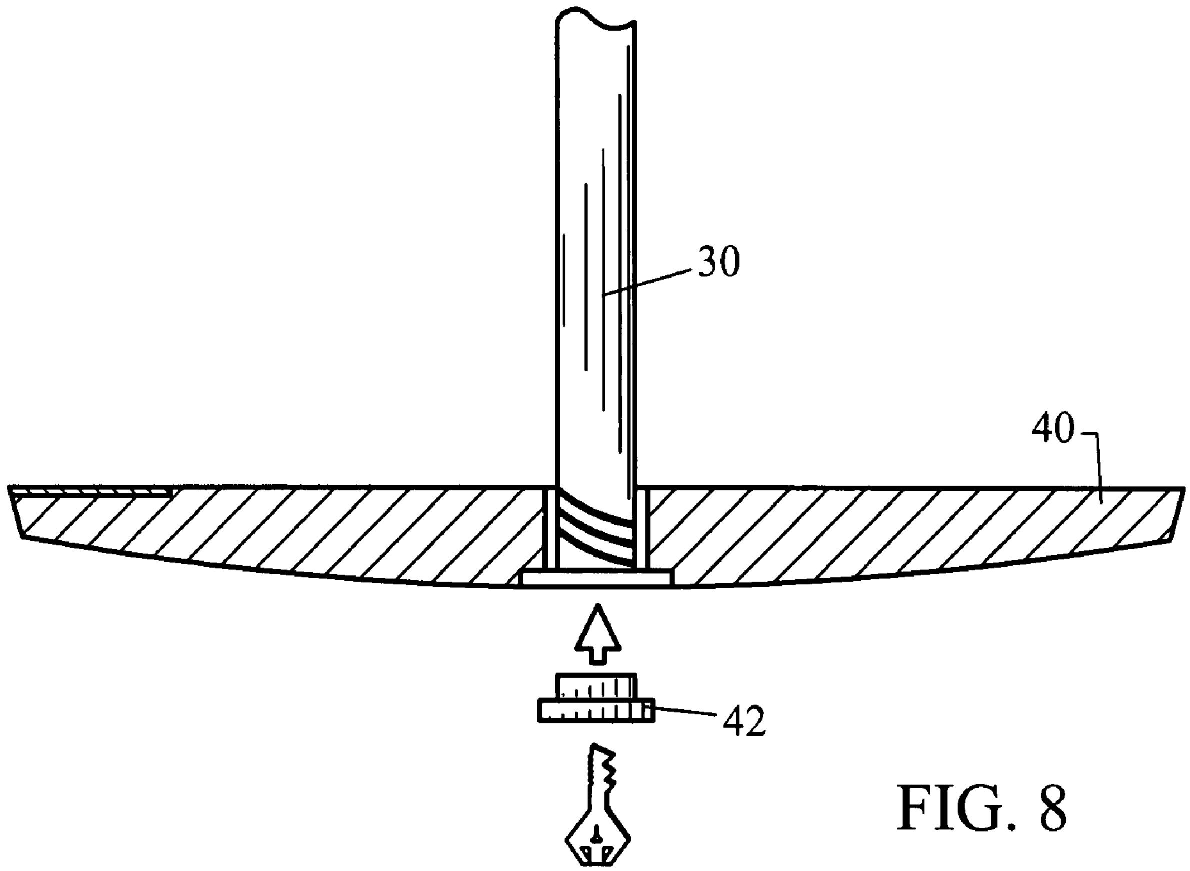
FIG. 8 is a side view depicting the overhead suspension member and locking mount.

As illustrated in FIGS. 4 and 5, a projector mount 40 is secured to the projecting end of suspension member 30 in underlying supporting engagement with projector 10. Projector mount 40 preferably comprises a generally planar supporting surface and is adapted with a locking mechanism 42 to provide a secured connection with suspension member 30 as best seen in FIG. 8. As should now be apparent, projector 10 may not be removed from its mounting assembly without first unlocking and removing projector mount 40 so as to allow the projector housing 11 to move downwardly until the lowermost portion of suspension member 30 exits housing aperture 20.

Figure 6:
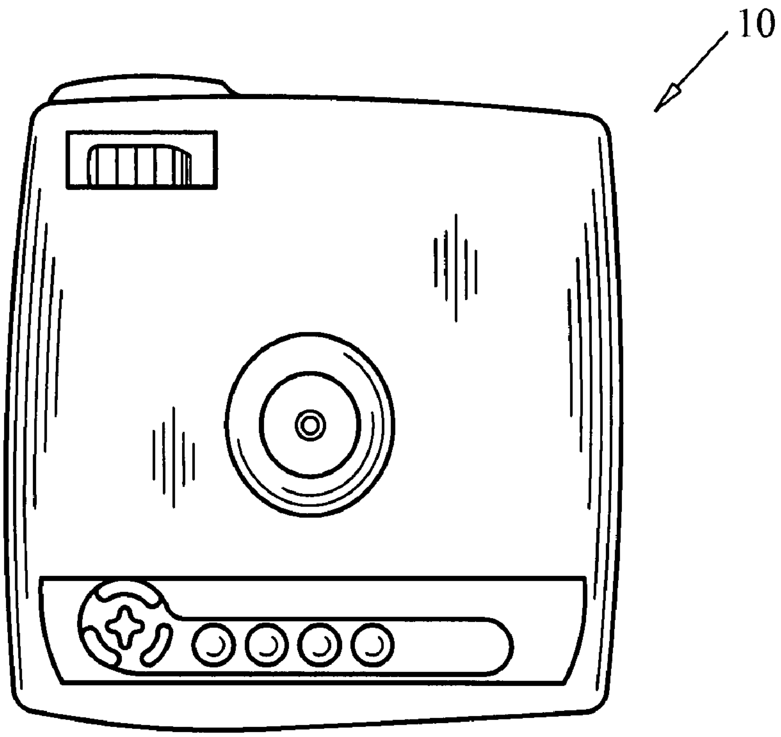
FIG. 6 is a bottom view thereof.
Figure 7:
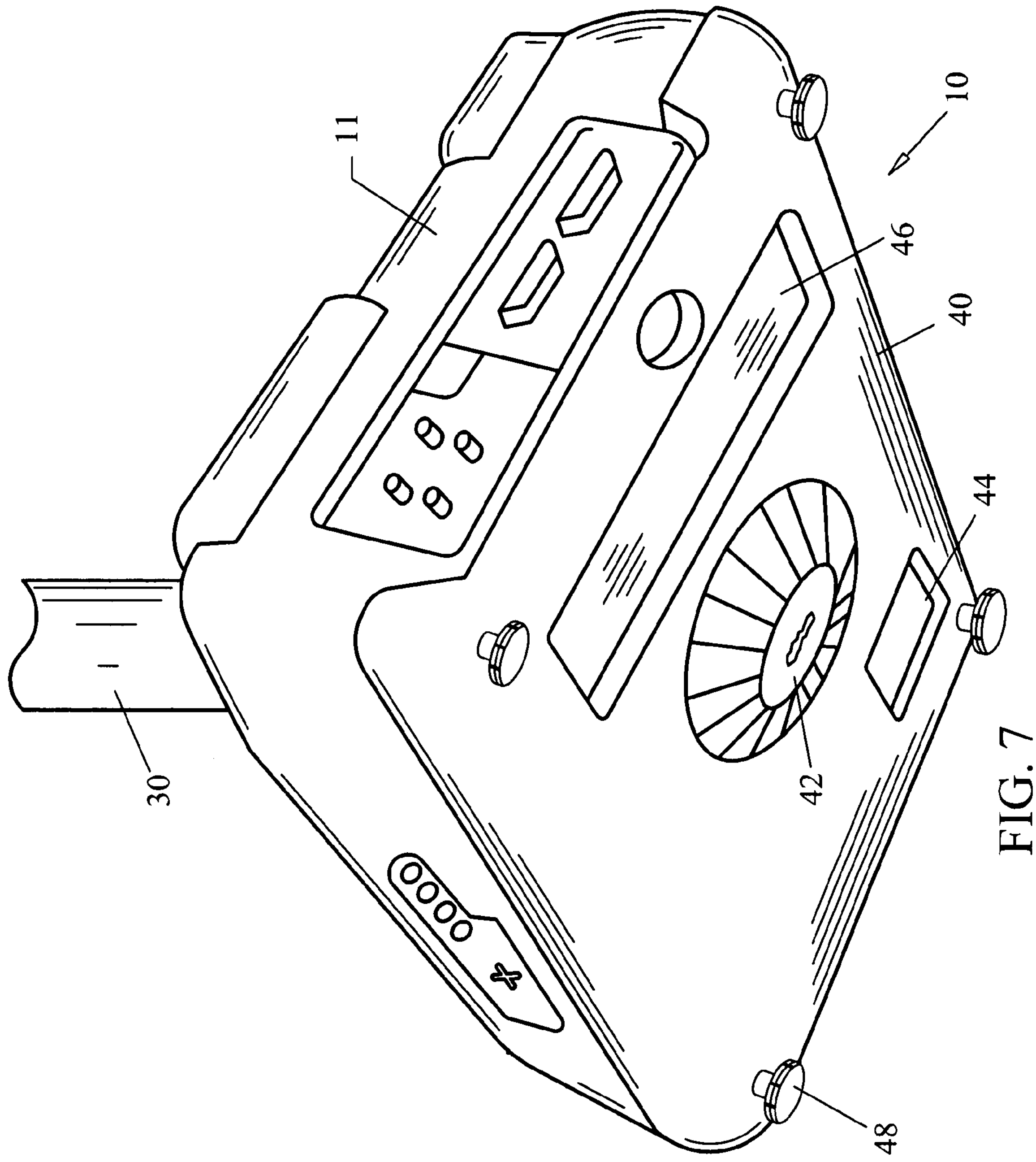
FIG. 7 is a perspective view thereof.
Figure 9A:
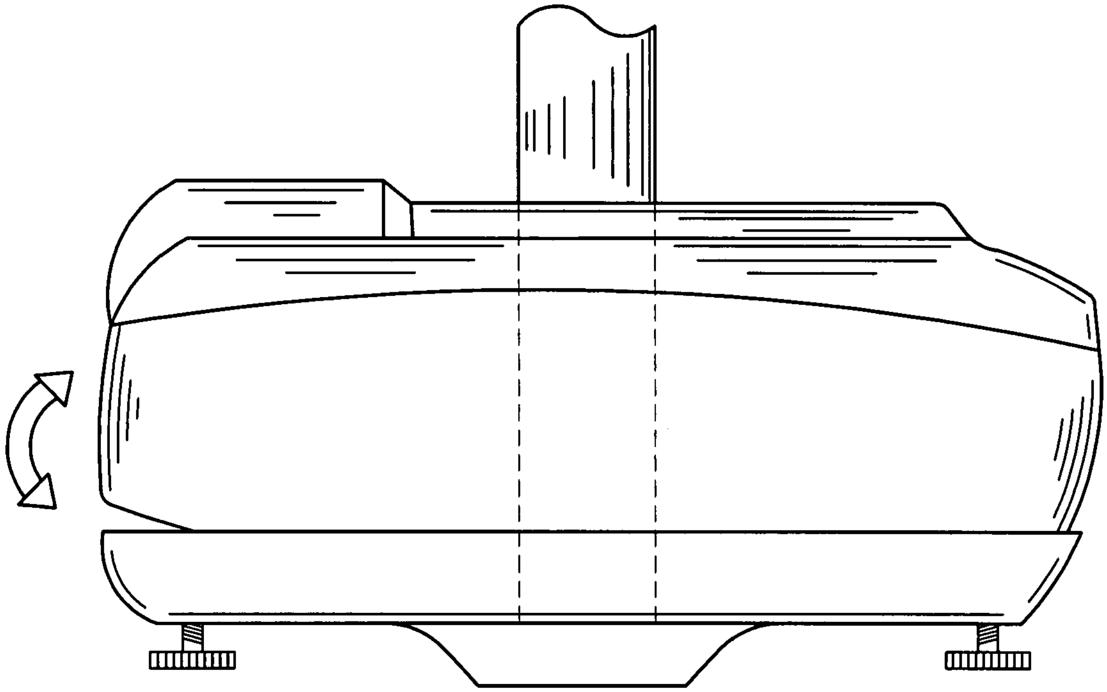
FIGS. 9A and 9B illustrate tilt adjustment of the projector from a generally horizontal configuration to a downwardly angled configuration.
Figure 9B:
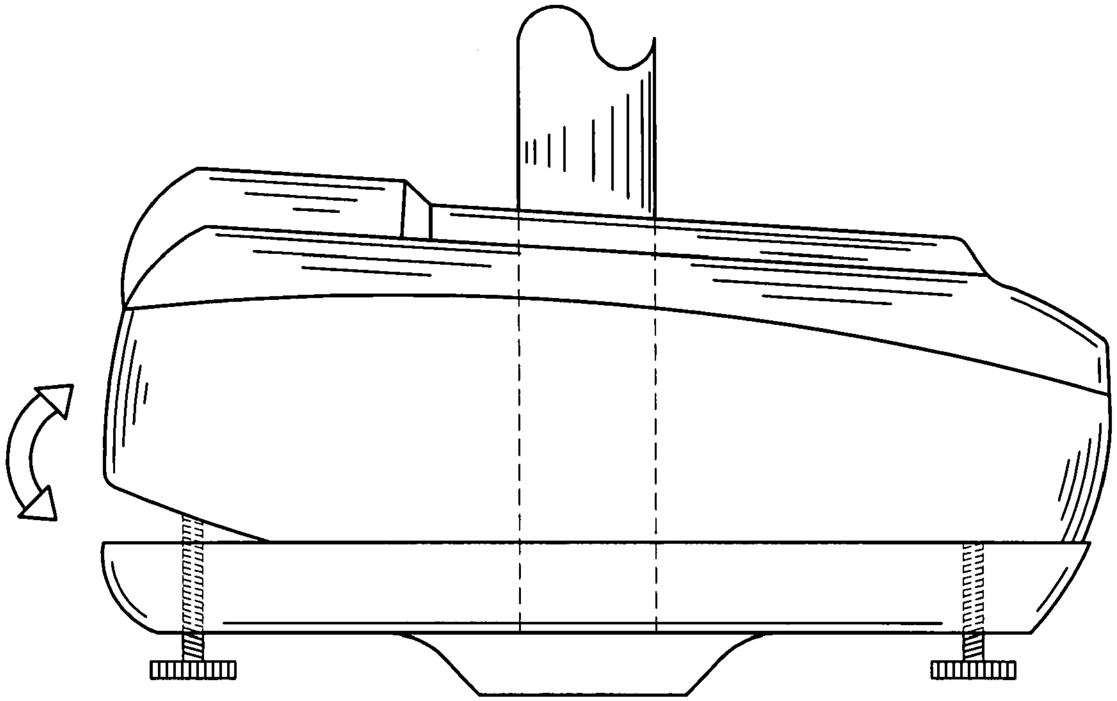

As best seen in FIGS. 6 and 7, projector mount 40 is preferably adapted with openings, referenced as 44 and 46, to allow for access to the projector controls and lens. More particularly, projector mount 40 includes a front opening 44 to allow access to the lens from below the assembly. In addition, projector mount 40 includes a rear opening 46 to allow access to projector controls existing on the underside thereof. A further aspect of the present invention includes providing tilt adjustment that is facilitated by rotatably adjustable fasteners, generally referenced as 48, in threaded engagement with projector mount 40 as illustrated in FIGS. 9A and 9B. Housing aperture 20 has a diameter that is larger than the diameter of suspension member 30 to allow for pitch adjustment of housing 12. In accordance with this aspect of the invention, fasteners 48 may be rotationally adjusted so as to raise and/or lower projector 10 so as to properly position a projected image. Accordingly, projector 10 may be adjusted from a generally horizontal configuration, as shown in FIG. 9A, to a tilted configuration as shown in FIG. 9B. Adjustment structure may alternately be incorporated directing into the projector housing.

Figure 10:
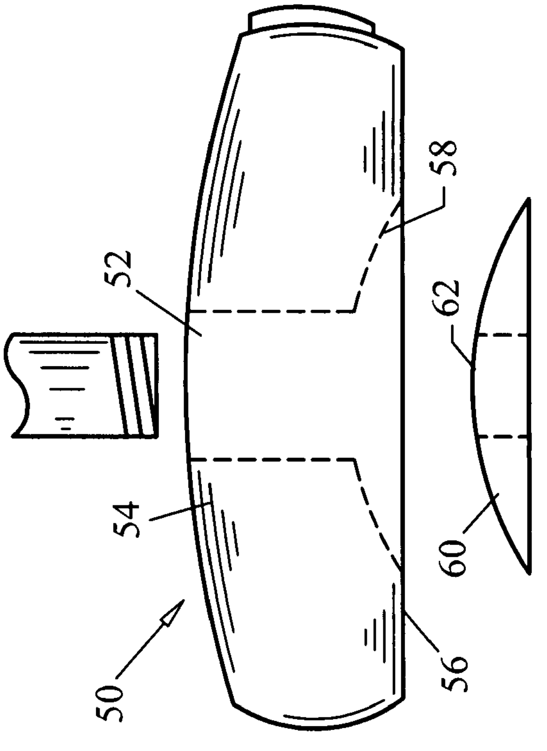
FIGS. 10-12 depict an alternate embodiment projector housing and mount.
Figure 11:
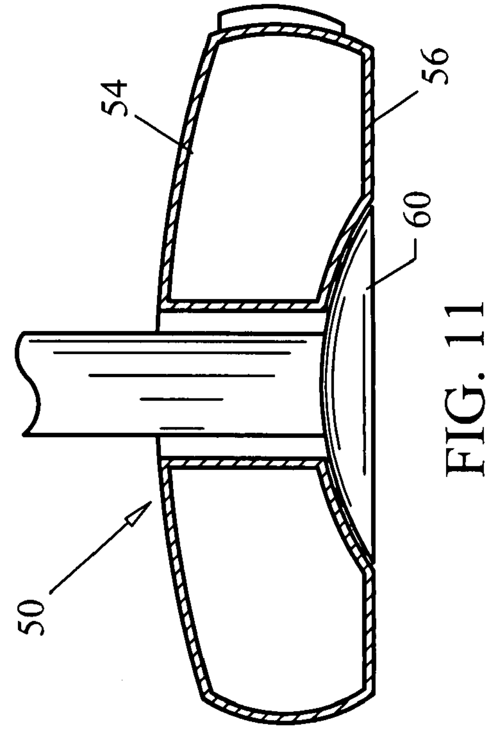
Figure 12:
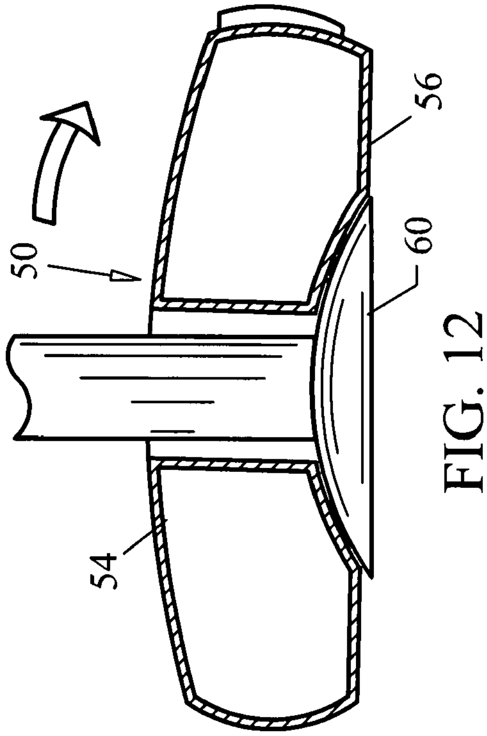
Figure 14:
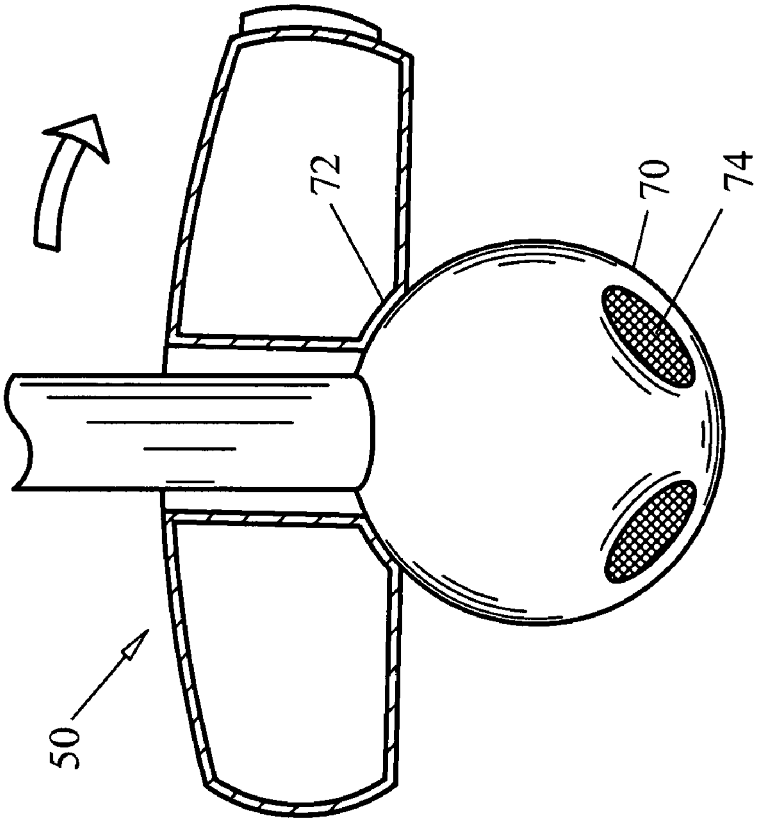
FIGS. 13 and 14 depict another alternate embodiment mount.
Figure 13:
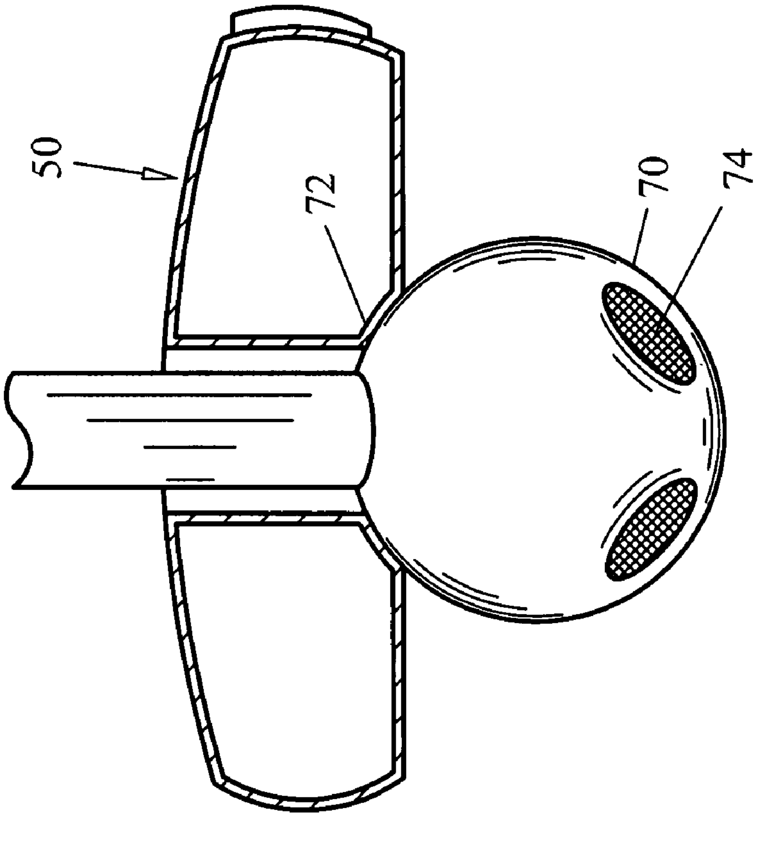

FIGS. 10-12 depict an alternate embodiment projector and mount system in accordance with the present invention. In this embodiment a projector, referenced as 50 is similarly adapted with a generally cylindrical aperture 52 extending completely through the projector housing from top 54 to the bottom 56. Bottom 56 is defines a concave hemispherical surface 58 in surrounding relation with the cylindrical mounting aperture 52. An attachable projector mount 60 is fabricated to define a convex hemispherical top surface 62 for mating engagement with the concave bottom surface of projector 50. As illustrated in FIGS. 11 and 12, the corresponding concave and convex surfaces allow the projector to be manually adjusted in tilt, pan, and yaw axes. FIGS. 13 and 14 depict an alternate embodiment generally spherical mount, referenced as 70, for use with a projector having a housing aperture and concave bottom in surrounding relation with the aperture. More particularly, mount 70 includes a convex upper surface 72 adapted for locking connection to the lower end portion of a suspension member 30 having an upper end portion securely connected to an overhead structure. In this embodiment, mount 70 is further adapted to provide audio output by incorporating speakers, referenced as 74. As should be apparent, speakers 74 function to provide audio output for programming emanating from projector 50 thereby eliminating the need to install and wire remote speakers. Mount 70 is preferably fabricated as a spherical body.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. An anti-theft projector and mounting assembly for securely mounting the projector from an overhead structure comprising:

a suspension member having an upper end connected to the overhead structure and a lower end, said suspension member being generally cylindrical and sized to a first diameter;

a video projector unit including a housing, said housing having a top, a bottom, and defining an aperture sized to a second diameter, said second diameter being sufficiently larger than said first diameter to permit pitch adjustment of said housing;

a mount, adapted for removable connection to the lower end of said suspension member; and means for locking said mount to said suspension member whereby unauthorized removal of said video projection unit is achieved.

2. An anti-theft projector and mounting assembly according to claim 1, wherein said mount comprises a load bearing plate for supporting said video projection unit.

3. An anti-theft projector and mounting assembly according to claim 2, wherein said plate is adapted with means for positional adjustment of said video projection unit.

4. An anti-theft projector and mounting assembly according to claim 2, wherein said mount defines at least one opening for providing user access to controls on said video projector unit.

5. An anti-theft projector and mounting assembly according to claim 1, wherein the bottom of said video projector housing includes a concave portion, and said mount includes a convex upper surface sized for mating engagement with said concave portion on said projector housing bottom.

6. An anti-theft projector and mounting assembly according to claim 1, wherein said mount further includes means for producing audio output.

* * * * *